United States Patent
Ahiska et al.

(10) Patent No.: US 9,141,615 B1
(45) Date of Patent: Sep. 22, 2015

(54) INTERACTIVE MEDIA SERVER

(75) Inventors: Yavuz Ahiska, Esher (GB); Ford Oxaal, Cohoes, NY (US)

(73) Assignee: Grandeye, Ltd., London (GB)

( * ) Notice: Subject to any disclaimer, the term of this patent is extended or adjusted under 35 U.S.C. 154(b) by 786 days.

(21) Appl. No.: 11/273,242

(22) Filed: Nov. 14, 2005

Related U.S. Application Data (60) Provisional application No. 60/627,531, filed on Nov. 12, 2004.

(51) Int. Cl.
| | | |
|---|---|---|
| *G06F 7/00* | (2006.01) | |
| *G06F 17/00* | (2006.01) | |
| *G06F 3/00* | (2006.01) | |
| *G06F 3/14* | (2006.01) | |
| *G06F 17/30* | (2006.01) | |

(52) U.S. Cl.
CPC .......... *G06F 17/30017* (2013.01); *G06F 3/005* (2013.01); *G06F 3/1415* (2013.01); *G06F 17/30023* (2013.01); *G06F 17/30029* (2013.01); *G06F 17/30038* (2013.01); *G06F 17/30058* (2013.01)

(58) Field of Classification Search
CPC .................... G06F 17/30017; G06F 17/30029; G06F 17/30058; G06F 17/30038; G06F 17/30023; G06F 3/1415; G06F 3/005; G06F 3/0425
See application file for complete search history.

(56) References Cited

U.S. PATENT DOCUMENTS

| | | | |
|---|---|---|---|
| 3,725,563 A | 4/1973 | Woycechowsky | |
| 4,656,506 A | 4/1987 | Ritchey | |
| 4,667,236 A | 5/1987 | Dresdner | |
| 4,728,839 A | 3/1988 | Coughlan et al. | |
| 4,763,280 A | 8/1988 | Robinson et al. | |
| 4,772,942 A | 9/1988 | Tuck | |
| 4,821,209 A | 4/1989 | Hempel et al. | |
| 4,905,077 A | 2/1990 | Ishii | |
| 5,023,725 A | 6/1991 | McCutchen | |
| 5,027,287 A | 6/1991 | Artigalas et al. | |
| 5,047,868 A | 9/1991 | Takeda et al. | |
| 5,067,019 A | 11/1991 | Juday et al. | |
| 5,068,735 A | 11/1991 | Tuchiya et al. | |

(Continued)

FOREIGN PATENT DOCUMENTS

| | | | |
|---|---|---|---|
| EP | 1 341 383 A2 | 9/2003 | |
| EP | 1341383 A2 | 9/2003 | |

(Continued)

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner* — Loan T Nguyen (74) *Attorney, Agent, or Firm* — Robert O. Groover, III; Seth A. Horwitz; Groover & Associates PLLC (57) ABSTRACT

A system and method for distributing image sequences to multiple clients according to individual or grouped client requests. In a preferred embodiment, an innovative media server includes image processing nodes which modify an image sequence as received from a wide-angle source, according to a request from a client or client characteristics. Requests can be grouped and/or compressed so as to reduce necessary bandwidth.

20 Claims, 4 Drawing Sheets

(56) References Cited

U.S. PATENT DOCUMENTS

| | | | |
|---|---|---|---|
| 5,130,794 | A | 7/1992 | Ritchey |
| 5,185,667 | A | 2/1993 | Zimmermann |
| 5,321,776 | A | 6/1994 | Shapiro |
| 5,325,483 | A | 6/1994 | Ise et al. |
| 5,359,363 | A | 10/1994 | Kuban |
| 5,384,588 | A | 1/1995 | Martin et al. |
| 5,396,284 | A | 3/1995 | Freeman |
| 5,434,617 | A | 7/1995 | Bianchi |
| 5,444,478 | A | 8/1995 | Lelong et al. |
| 5,495,292 | A | 2/1996 | Zhang |
| 5,495,576 | A | 2/1996 | Ritchey |
| 5,644,715 | A | 7/1997 | Baugher |
| 5,666,157 | A | 9/1997 | Aviv |
| 5,684,937 | A | 11/1997 | Oxaal |
| 5,877,801 | A | 3/1999 | Martin et al. |
| 6,049,281 | A | 4/2000 | Osterweil |
| 6,121,966 | A | 9/2000 | Teodosio et al. |
| 6,147,709 | A | 11/2000 | Martin et al. |
| 6,201,574 | B1 | 3/2001 | Martin |
| 6,215,519 | B1 | 4/2001 | Nayar et al. |
| 6,226,031 | B1 * | 5/2001 | Barraclough et al. ..... 348/14.13 |
| 6,243,099 | B1 | 6/2001 | Oxaal |
| 6,337,708 | B1 | 1/2002 | Furland |
| 6,344,852 | B1 | 2/2002 | Zhu et al. |
| 6,509,926 | B1 | 1/2003 | Mills et al. |
| 6,603,502 | B2 | 8/2003 | Martin et al. |
| 6,675,386 | B1 | 1/2004 | Hendricks et al. |
| 6,724,421 | B1 | 4/2004 | Glatt |
| 6,732,162 | B1 | 5/2004 | Wood |
| 6,757,434 | B2 | 6/2004 | Miled et al. |
| 6,763,068 | B2 | 7/2004 | Oktem |
| 6,928,230 | B2 * | 8/2005 | Squibbs ........................ 386/46 |
| 7,034,927 | B1 * | 4/2006 | Allen et al. ...................... 356/71 |
| 7,114,170 | B2 * | 9/2006 | Harris et al. ..................... 725/34 |
| 2001/0016849 | A1 * | 8/2001 | Squibbs ..................... 707/104.1 |
| 2001/0017668 | A1 * | 8/2001 | Wilcock et al. ............... 348/552 |
| 2002/0063802 | A1 | 5/2002 | Gullichsen |
| 2003/0088575 | A1 * | 5/2003 | Gould et al. .................. 707/102 |
| 2003/0128756 | A1 | 7/2003 | Oktem |
| 2003/0206549 | A1 * | 11/2003 | Mody et al. .................... 370/390 |
| 2003/0229900 | A1 * | 12/2003 | Reisman ......................... 725/87 |
| 2004/0199575 | A1 * | 10/2004 | Geller ........................... 709/201 |
| 2005/0007453 | A1 * | 1/2005 | Ahiska ........................... 348/143 |
| 2005/0007478 | A1 | 1/2005 | Ahiska |
| 2005/0028215 | A1 * | 2/2005 | Ahiska ........................... 725/105 |

FOREIGN PATENT DOCUMENTS

| | | |
|---|---|---|
| WO | 9750252 A | 12/1997 |
| WO | 0195608 A | 12/2001 |
| WO | 02062056 A1 | 8/2002 |
| WO | WO 02/062056 A1 | 8/2002 |

OTHER PUBLICATIONS

Y. Yardimci, I. Yilmaz, A. E. Cetin, "Correlation Tracking Based on Wavelet Comain Information," Proceedings of SPIE vol. 5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

INTERACTIVE MEDIA SERVER

CROSS-REFERENCE TO RELATED APPLICATIONS

This application claims priority from U.S. provisional patent application 60/627,531 filed on Nov. 12, 2004, which is hereby incorporated by reference.

BACKGROUND AND SUMMARY OF THE INVENTION

1. Field of the Invention

The present inventions relate to a media server, an more specifically to an interactive media server that distributes image sequences to multiple clients.

2. Description of Background Art

With the growth of processing capability, networking, and bandwidth, it has become possible to send and receive large amounts of data to a vast array of locations. One benefit of these advances has been in the area of video content. Computers can now receive, store, manipulate, and transmit the large amounts of data necessary for remote viewing of video, whether live or stored. For example, in the area of security cameras, output from a camera (such as a wide-angle camera) can be sent to a station where one or more clients can view the image sequences captured by the camera.

Such systems are typically hard-wired so that the client sees the unmodified output of the camera. For example, in a closed-circuit security system, several clients may be linked to view the output of several different security cameras. However, this requires a large redundancy in hardware so that a large number of views can be displayed.

Advances in wide-angle image capture devices permit processing of captured data, for example, to modify the view by changing its coordinate space (or otherwise modifying a warped, non-Cartesian view) in deference to a request received from a client. For example, such systems are variously described in U.S. patent application Ser. No. 10/837,325, "Multiple View Processing in Wide Angle Video Camera," U.S. patent application Ser. No. 10/837,019, "Method for Simultaneously Displaying Multiple Views for Video Surveillance," and U.S. patent application Ser. No. 10/861,021, "Network Camera Supporting Multiple IP Addresses," all of which are hereby incorporated by reference.

Interactive Media Server

In an example class of embodiments, the present innovations include an interactive media server which enables multiple clients to independently and interactively extract views from an image source. In preferred embodiments, the present innovations are practiced in the context of an interactive media server and multiple light weight clients which operate independently to interact with the media server and extract views from a single (or multiple) image source(s). The media server of the present innovations can be virtual, for example, distributed across multiple physical locations, or it can be localized. The media server can interact with a fixed number of interactive clients (for example, across a network connection such as a local area network (LAN) or a wide area network (WAN) or the Internet) in proportion to a number of image processor nodes included in the media server. For example, in one embodiment, the image processor nodes are assigned to clients in a dedicated fashion. In other embodiments, clients are grouped according to similarities or other characteristics, and are served as groups. In this example embodiment, larger numbers of clients can be served. Other features and advantages of the present innovations are described below.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 1:
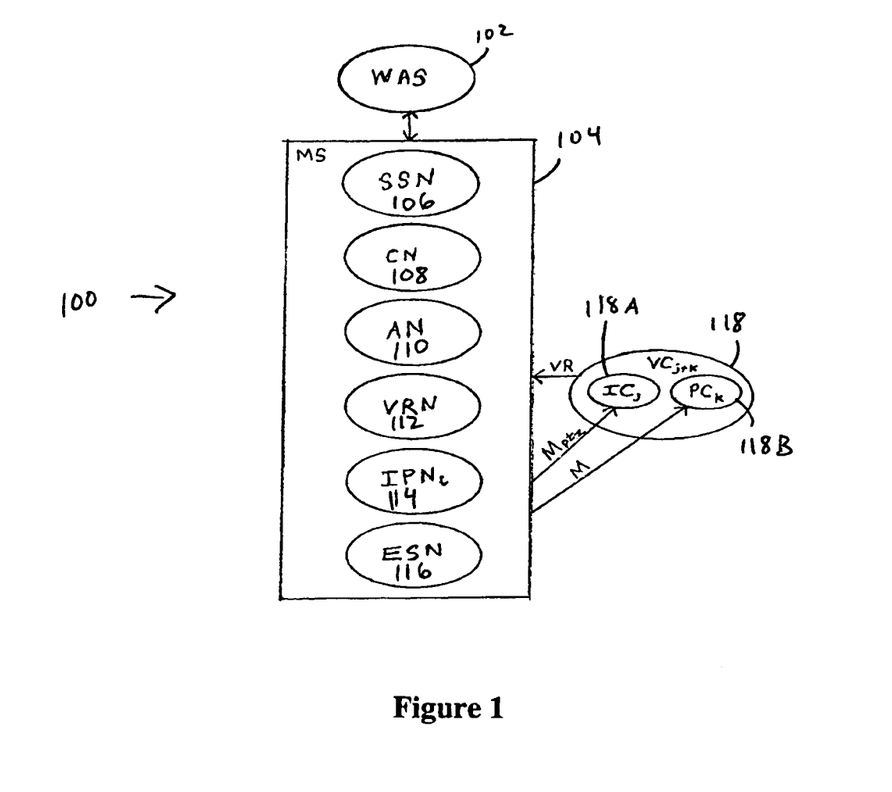
FIG. 1 shows an interactive media server consistent with a preferred embodiment of the present innovations.

FIG. 1 shows an interactive system 100 consistent with a preferred embodiment of the present innovations. In this example, a media server 104 (MS) communicates with a wide-angle source 102 (WAS) (or a plurality of wide-angle sources) and one or more viewer clients 118 ($VC_{j+k}$). The viewer clients 118 can include both interactive clients 118A ($IC_j$) and passive clients 118B ($PC_k$). In this example embodiment, the media server 104 includes several nodes, some or all of which can be used to practice the present innovations. It is noted that the particular arrangement of nodes and tasks need not adhere exactly to this example, which is intended only to describe one possible (and preferred) embodiment. For example, the tasks assigned to the described nodes can be redistributed, combined, or separated among these or other nodes without deviating from the scope of the present innovations. A wide-angle source 102 can be a video camera (or still camera) capable of taking images and conveying them to media server 104. Though preferred embodiments include wide-angle sequences, other types of image producing nodes can be used.

In a preferred embodiment, the media server includes a source sequence node 106 (SSN), a connection node 108 (CN), an association node 110 (AN), a view request node 112 (VRN), one or more (preferably a plurality of) image processor nodes 114 ($IPN_i$), and an emitted sequence node 116 (ESN). In this example, the image processor nodes are labeled with a subscript "i" to denote the plurality of such nodes, while interactive clients 118A are labeled with a subscript "j" and passive clients 118B are labeled with a subscript "k". Clients can preferably form one or more connections with one or more systems, including the media server and some of its nodes. A client can have properties set by an external system to which it is connected, and can have characteristics which can be used by one or more nodes of the innovative system to adjust, for example, emitted sequences in various ways. Clients can make requests to passively view, selectively view, or interactively view media. Passive viewing includes viewing an emitted sequences associated with the media server. Selective viewing includes passive viewing with the added ability to send specific types of view requests (VR) to the media server and, as a result, browse multiple sequences. For example, the multiple sequences could include pre-determined views from the camera, other sequences requested by other clients, or sequences from multiple wide-angle sources. Interactive viewing includes the capability of both passive and selective viewing, with the additional capability to send view requests to the media server and, as a result, exercise some control over how a source sequence is processed to become an emitted sequence.

In preferred embodiments, media server 104 is capable of processing view requests from a number of interactive clients 118A in proportion to the number of image processor nodes 114. In this example configuration, the image processor nodes 114 are assigned to viewer clients 118 in a dedicated fashion. In other preferred embodiments, clients (e.g., their requests) are grouped according to similarity of the requests. For example, two or more different clients may request the same or similar image sequences, depending on their respective view request. For example, two clients could request similar, pan, tilt, and zoom specification for their requested image sequence. Their requests can be efficiently serviced by a single image processor node, so their requests are associated with one another and both are assigned to the same image processor node. Both clients receive the same image sequence. As mentioned further below, client requests can also be limited to facilitate this grouping. For example, rather than continuous pan, tilt, and zoom specifications, these details can be limited to incremental pan, tilt, and zoom. By limiting the details of the requests, more client requests can be grouped and therefore serviced by a single image processor node. It is also noted that clients which do not specify such details (e.g., passive clients) can also be grouped and serviced by a single image processing node. Grouping of clients and/or requests can occur at any node of a server, or such function can of course be distributed and/or implemented as software or hardware (or a combination of both).

Image processor nodes 114 preferably include capability to receive, input, process, and output a sequence in response to one or more view requests. Processing can include such operations as, but not limited to, panning, tilting, zooming, cropping, clipping, rotating, transforming, adjusting resolution, formatting, and other functions. The processing performed by an image processor node can also take into account various characteristics of the requesting node (such as a client). The source sequence node 106 preferably receives source sequences from the wide-angle source 102 and routes (and potentially processes) the source sequences to the image processor nodes 114. In preferred embodiments, a single source sequence is routed to all the image processor nodes 114, which themselves perform further processing. In other embodiments, if there is only one source sequence input in a server context, then the source sequence node can be hardwired such that the source sequence is directed to where it needs to go in the server. The connection node 108 controls connections within and between nodes (and potentially clients), as described more fully below. (See FIG. 2). The association node 110 forms association instances, as described more fully below. (See FIG. 3.) The view request node 112 routes view requests, as described more fully in FIG. 4. The emitted sequence node 116 routes emitted sequences.

In preferred embodiments, the media server is capable of generating a fixed number of emitted sequences and distributing them to multiple viewer clients. The media server is preferably capable of receiving and/or determining or making guesses about client characteristics and processing the emitted sequences in response thereto. In preferred embodiments, the media server's emitted sequences are referred to as media streams (M or $M_{ptz}$), though other terminology is also used in the art to describe such media. No definitions in the present application is intended to contradict existing definitions with respect to those of ordinary skill in the art.

In preferred embodiments, viewer clients serviceable by the media server are light weight web clients capable of receiving and displaying media streams from a web based server, capable of accepting local device input such as mouse and keyboard input and in response thereto, capable of issuing view requests to said web based server over time, and may be capable of conveying characteristics to the web based server.

The connection node is preferably implemented as server side software and/or hardware. In preferred embodiments, the connection node maintains an interactive client queue and a passive client set. When the connection node is initialized, the queue and set are cleared. The connection node receives all requests for connecting to the media server, and receives all requests for disconnecting from the media server. For each request to connect or disconnect, the connection node checks for the identification of the client or other source making the request, uses that information to authenticate the client or otherwise authorize the connection or disconnection. Once a connection request is authorized, the connection node determines whether to allow the client to connect based on availability and/or other criteria, and if a connection is allowed, sets up the connection and puts a record for that client either at the tail of the interactive client queue, or within the passive client set, depending on the request. Once a disconnection request is authorized, the client is removed from either the interactive client queue or passive client set, and the record for that client is deleted, and the connection is terminated. When a connection is terminated, a message is sent to the association node.

The association node is preferably implemented as server side software and/or hardware. The association node maintains a node queue. When the association node is initialized, records for all image processor nodes are created and placed in the node queue. The association node operates such that it periodically checks the head of the node queue to see if there are any image processor nodes available to provide interactive service. If so, it then checks the head of the interactive client queue to see if there are any clients waiting for interactive service. If there are, it creates an association instance between the client whose record is at the head of the interactive client queue and the image processor node whose record is at the head of the node queue, adds the association instance to an association set, removes both said records from their respective queues, and creates a view request queue pointed to by that association instance, as well as by the associated image processor node. Available characteristics for the client are also conveyed to the associated image processor node which in turn uses this information to adjust its emitted sequence accordingly. For example, an interactive client running on a cell phone will typically require an emitted sequence of less resolution with fewer bits per pixel, and greater compression than an interactive client running on a personal computer, and by using characteristics associated with the client, the image processor node may adjust its emitted sequence accordingly. When the connection between a client and the media server is terminated by the connection node, or when a view request is received by the view request node to terminate interactive service for a given client, but to continue passive service for that client, a message is sent to the association node. If there is an association instance for that client, then the image processor node associated with that client is appropriately initialized and its record is placed in the tail of the node queue and the association instance is removed from the association set and deleted along with the view request queue it points to.

The view request node is preferably implemented as server side software and/or hardware. The view request node receives and processes all incoming view requests, and discards the ones not sent to a view request queue when processing is finished. For each view request, it first checks to see if the request is from a client in the passive client set desiring to receive interactive service, or from an interactive client desiring to receive passive service. If so, the view request node either removes the record for that client from the passive client set and adds it at the tail of the interactive client queue, or it adds the record for that client to the passive client set and sends a message to the association node. If not, it checks for the identification of the client making the request, or on whose behalf the request is made, and searches the association set to see if there is an association instance for that client. If not, it discards the view request. If so, it routes the view request to the association instance's view request queue.

The emitted sequence node is preferably implemented as server side software and/or hardware. When a client is added to the passive client set or the interactive client queue, a message is sent to the emitted sequence node, the emitted sequence node examines the client's characteristics and an appropriate pre determined media stream or adjusted emitted sequence from an image processor node is routed to that client. When an association instance is created, a message is sent to the emitted sequence node, and the emitted sequence node routes the emitted sequence from the associated image processor node to the client. When a connection to a client is broken, a message is sent to the emitted sequence node, and the emitted sequence node preferably stops the delivery of whatever emitted sequence is being delivered to that client. Before or during the time an emitted sequence is routed to the client, more data may be added to it by the emitted sequence node, including, but not limited to, a wider view putting the extracted view into context, a director's view, or textual and numerical data. The emitted sequence is sent uncompressed, or compressed using the required technique which may include without limitation MPEG2, MPEG4, or H264. The emitted sequence is formatted in a manner suitable for the transmission medium and delivered to the client.

In preferred embodiments, the image processor nodes collectively contain some number of IMTERA2 CHIPS. One IMTERA2 CHIP is capable of servicing a fixed number of interactive clients. In one embodiment, there is one image processor node active per interactive client. When the association node creates an association instance, it points the associated image processor node to the view request queue for that association instance. When an image processor node has a non null pointer to a view request queue, it repeatedly processes the view request from the head of the queue, generates an emitted sequence corresponding to the view request, and discards the view request. If there are more interactive clients connected to the media server than there are image processor nodes available to provide interactive service, then those extra interactive clients are serviced as passive clients by the emitted sequence node, or they can be grouped so that multiple clients can be serviced by single image processing nodes.

In preferred embodiments, the wide angle source consists of a video camera outfitted with a wide angle optical lens typically in the region of 170 to 190 degrees field of view.

As the number of clients connected to the media server and receiving interactive service increases, the number of independent emitted sequences also increases and may increase to the point where the available transmission bandwidth is exceeded. This is called the "available transmission bandwidth problem." Also, there may be more clients requesting interactive service than the media server is capable of servicing. This is called the "available interactive service problem." One way of solving the available transmission bandwidth problem is as follows: the compression of emitted sequences may be increased, dynamically or otherwise, so that the available transmission bandwidth is no longer exceeded, although at the cost of reduced quality. Another approach solves both the available transmission bandwidth problem and the available interactive service problem at the same time. This approach samples all the view requests in a given time interval and groups together those that are similar and then uses techniques, such as averaging, for mapping the similar view requests to a single view request. A single emitted sequence is thereby generated for a group of clients and is delivered to all clients in that group. By reducing the number of emitted sequences per client the bandwidth generated by the media server is significantly reduced; furthermore, as the number of clients, and therefore, also likely, the number of view requests increases, the odds of a client falling within an existing group increases. But if necessary, the grouping criteria may be widened, dynamically or otherwise, causing more disparate view requests to be supplied by the same emitted sequence.

Furthermore, in order to increase the probability of multiple view requests being reduced to one view request, the user interface may limit the client's camera control to a certain number of presets, and not allow continuous pan, tilt, zoom. For example, by limiting rotations to five degree intervals and limiting zoom from one to ten in integer steps, the total number of presets is 25,920((360/5)*(180/5)*10). If the media server has to service 100,000 view requests, limiting the user interface according to the example reduces the transmitted bandwidth by a factor of 3.85(100,000/25,920); if the number of view requests is 1,000,000, limiting the user interface according to the example reduces the transmitted bandwidth by a factor of 38.5(1,000,000/25,920).

Client experience may be further enhanced by providing directionally enhanced sound. Thus, when a client is interested in a particular portion within the field of view of the wide angle source, the client's experience may be enhanced by emphasizing those sounds which are associated with that particular portion, and de emphasizing those sounds which are not associated with that particular portion. And again, we may reduce the number of requests by limiting the directional resolution of the sound field. For example, by limiting rotations to 30 degree intervals and limiting zoom from one to ten in integer steps, the total number of sound presets is 180((360/30)*(180/30)*10). Sound data, which is part of a source sequence can be processed at IMTERA2 based nodes and incorporated in the emitted sequence from that node.

The following flowcharts depict processes consistent with implementing preferred embodiments of the present innovations. They are intended to teach by way of example, and are not intended to limit the present innovations.

Figure 2:
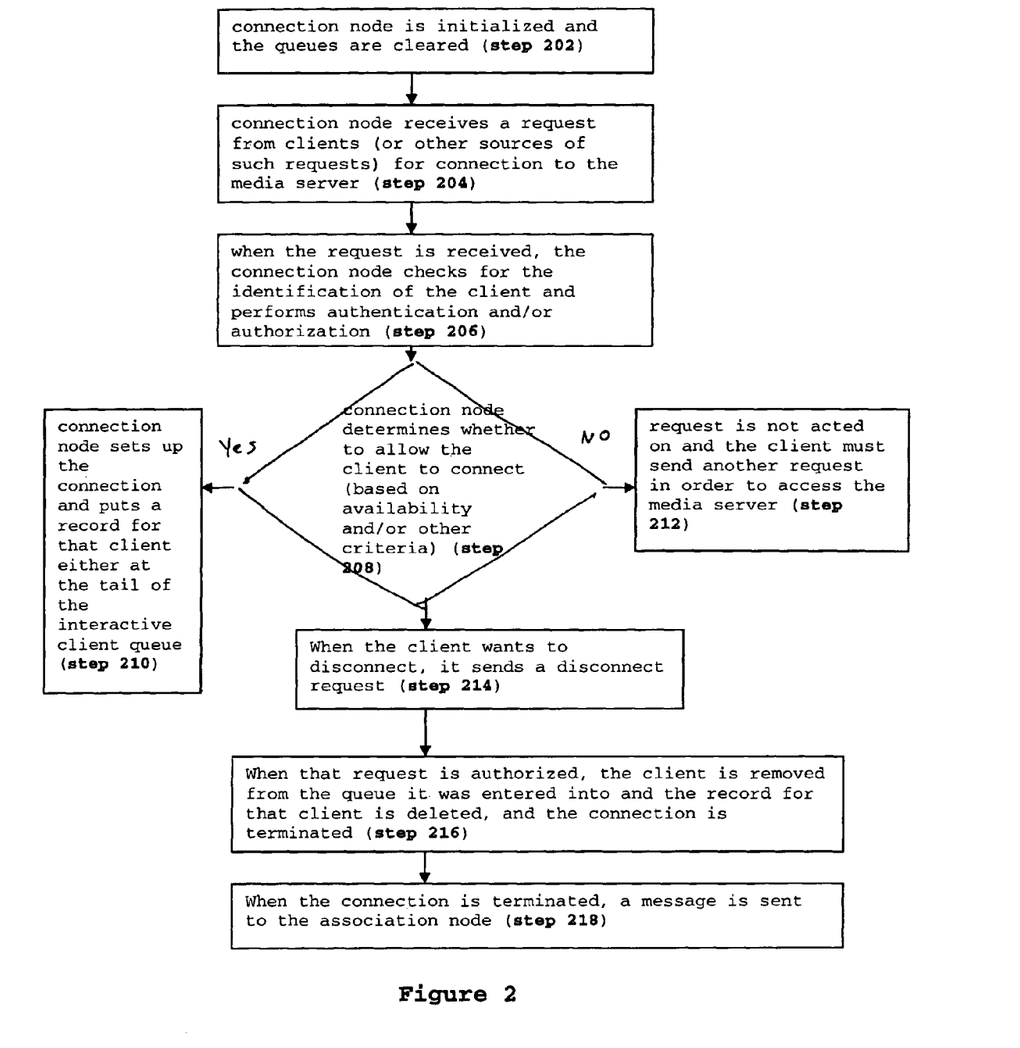
FIG. 2 shows a flowchart of process steps consistent with implementing a preferred embodiment of the present innovations.

FIG. 2 shows a flowchart of steps associated with the connection node, consistent with a preferred embodiment. First, the connection node is initialized and the queues are cleared (step 202). The connection node receives a request from clients (or other sources of such requests) for connection to the media server (step 204). When the request is received, the connection node checks for the identification of the client and performs authentication and/or authorization (step 206).

Next the connection node determines whether to allow the client to connect (based on availability and/or other criteria) (step 208). If a connection is allowed ("yes"), the connection node sets up the connection and puts a record for that client either at the tail of the interactive client queue or within the passive client set, depending on the request (step 210). If the client is not allowed to connect ("no"), the request is not acted on and the client must send another request in, order to access the media server (step 212). When the client wants to disconnect, it sends a disconnect request (step 214). When that request is authorized, the client is removed from the queue it was entered into and the record for that client is deleted, and the connection is terminated (step 216). When the connection is terminated, a message is sent to the association node (step 218).

Figure 3:
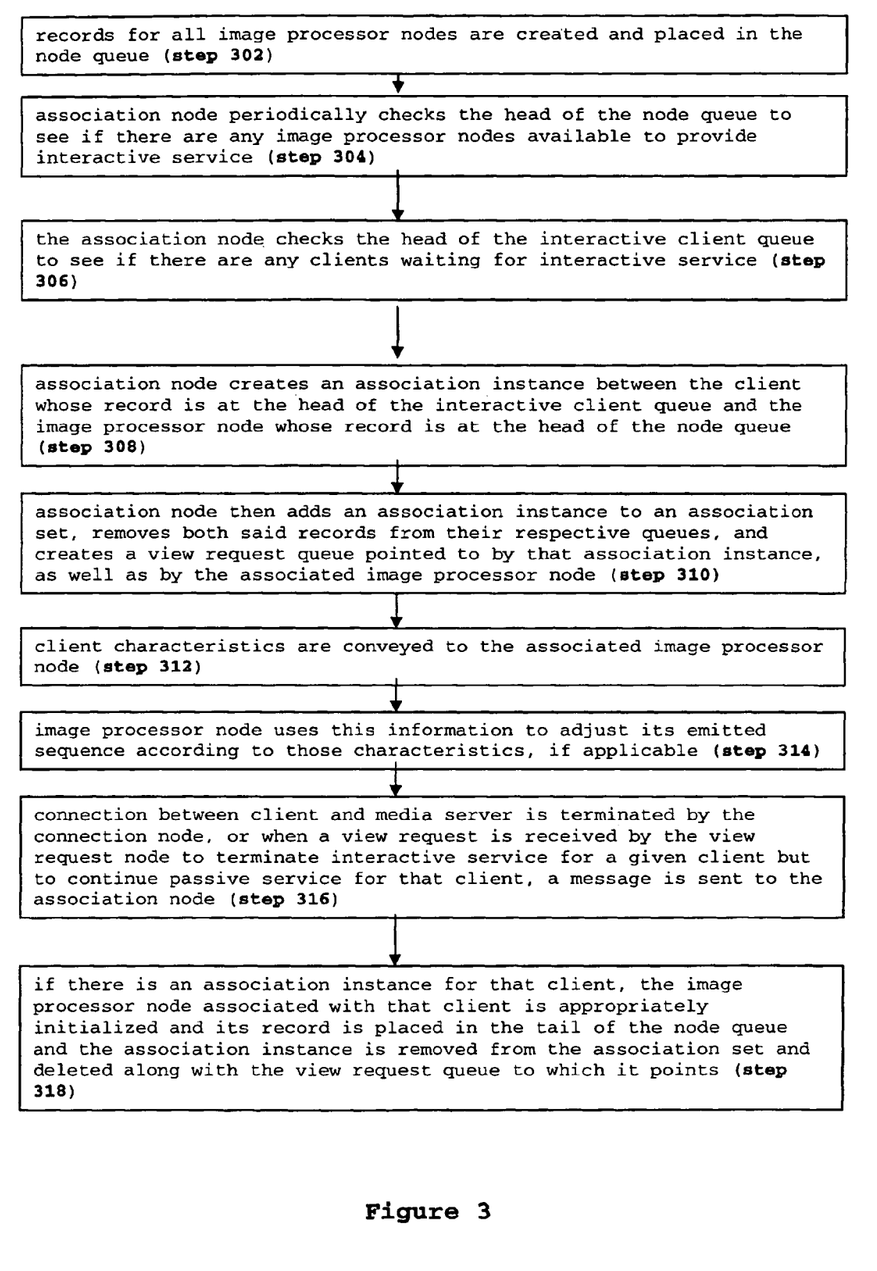
FIG. 3 shows a flowchart of process steps associated with the association node consistent with a preferred embodiment of the present innovations.

FIG. 3 shows a flowchart of process steps associated with the association node consistent with a preferred embodiment of the present innovations. When the association node is initialized, records for all image processor nodes are created and placed in the node queue (step 302). The association node periodically checks the head of the node queue to see if there are any image processor nodes available to provide interactive service (step 304). If there are, the association node checks the head of the interactive client queue to see if there are any clients waiting for interactive service (step 306). If there are, it creates an association instance between the client whose record is at the head of the interactive client queue and the image processor node whose record is at the head of the node queue (step 308). The association node then adds an association instance to an association set, removes both said records from their respective queues, and creates a view request queue pointed to by that association instance, as well as by the associated image processor node (step 310). Available client characteristics are conveyed to the associated image processor node (step 312). The image processor node uses this information to adjust its emitted sequence according to those characteristics, if applicable (step 314). When the connection between client and media server is terminated by the connection node, or when a view request is received by the view request node to terminate interactive service for a given client but to continue passive service for that client, a message is sent to the association node (step 316). If there is an association instance for that client, the image processor node associated with that client is appropriately initialized and its record is placed in the tail of the node queue and the association instance is removed from the association set and deleted along with the view request queue to which it points (step 318).

Figure 4:
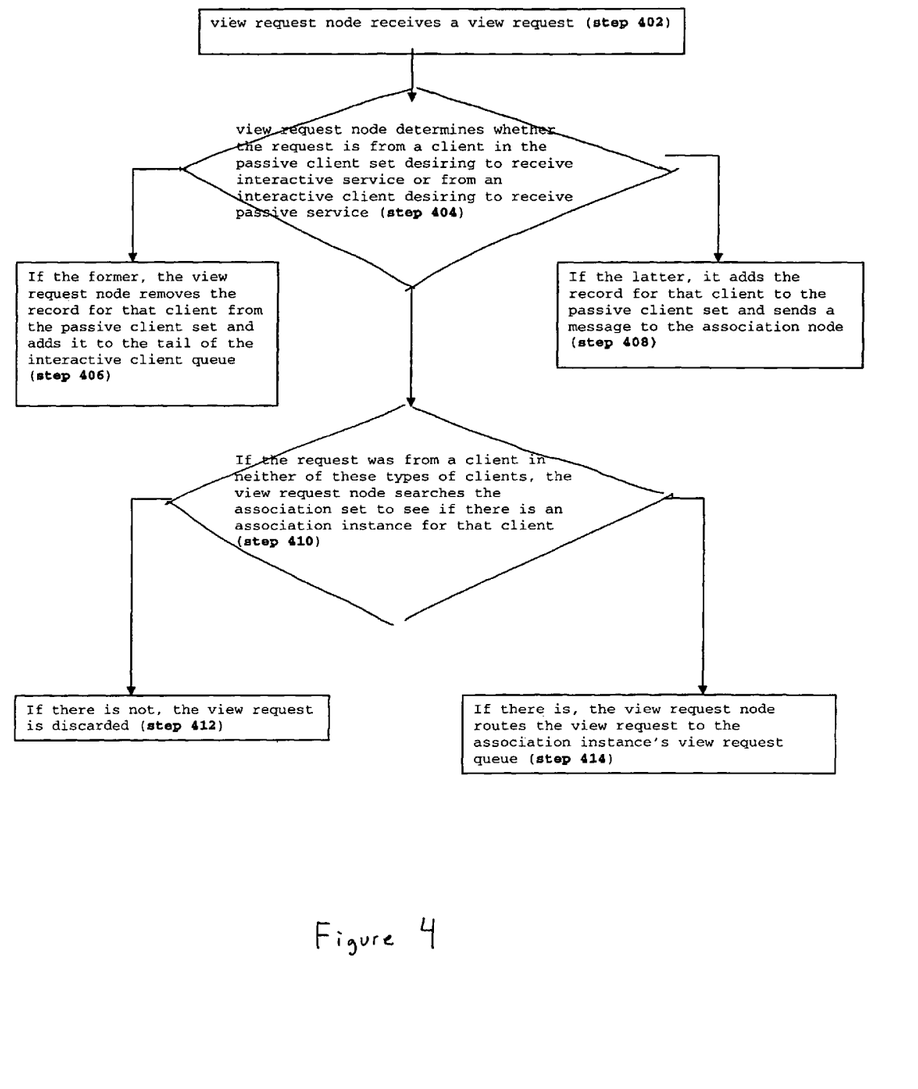
FIG. 4 shows a flowchart of process steps associated with the view request node consistent with a preferred embodiment of the present innovations.

FIG. 4 shows a flowchart of process steps associated with the view request node consistent with a preferred embodiment of the present innovations. When the view request node receives a view request (step 402), it determines whether the request is from a client in the passive client set desiring to receive interactive service or from an interactive client desiring to receive passive service (step 404). If the former, the view request node removes the record for that client from the passive client set and adds it to the tail of the interactive client queue (step 406). If the latter, it adds the record for that client to the passive client set and sends a message to the association node (step 408). If the request was from a client in neither of these types of clients, the view request node searches the association set to see if there is an association instance for that client (step 410). If there is not, the view request is discarded (step 412). If there is, the view request node routes the view request to the association instance's view request queue (step 414).

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, though the present innovations are described in the context of "a server", the functionality described herein can of course be distributed over multiple nodes or locations. Likewise, such functionality can be implemented in software and/or hardware.

Though a wide-angle source is referred to herein as the preferred image source, other image sources can also be implemented within the scope of the present innovations.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

Following is a glossary of terms used in the present application. No definitions presented herein are intended to contradict the meaning of these terms as understood by one of ordinary skill in the art.

ELECTRONIC DATA: data, whether in analog, digital, or other electronic form.

PROCESS/PROCESSING: operate on or in response to electronic data. An operation includes no op, that is, the null operation, or no operation.

SOUND DATA: electronic data representing sound.

SEQUENCE: electronic data representing an image or sequence of images, optionally including sound data.

MEDIA STREAM: sequence which can be transmitted over the web.

WIDE ANGLE SEQUENCE: sequence which is wide angle and high resolution.

SEQUENCE DEVICE: any device which can output at least one sequence such as a single camera, a plurality of cameras, a computer, a plurality of computers, a tape playback device, a disk playback device, a video mixer device, a web server capable of streaming media, an edge server capable of streaming media, etc.

SOURCE SEQUENCE: sequence output from a sequence device.

WIDE ANGLE DEVICE: a sequence device which outputs a wide angle sequence. For example, in preferred embodiments, a video camera employing wide angle optics such as an optical lens in the region of 170 to 190 degrees field of view is a wide angle device.

REQUEST: electronic data, whether generated by a human user or algorithmically or otherwise by a non human, representing a desire or group of desires, an instruction or group of instructions, or a hint or group of hints as well as information identifying the source of said electronic data.

VIEW REQUEST: request relating to sequence processing, such as requests for controlling pan, tilt, zoom, brightness, contrast, object tracking, object blanking, etc. A view request can also be a request to commence or to terminate service relating to sequences. A view request can also be a request to browse multiple sequences, for example, in a fashion such as changing channels on a television set.

IMAGE PROCESSOR NODE: a means for inputting, processing, and outputting a sequence in response to one or more view requests over time. Processing includes such operations as, but is not limited to, clipping, rotating, and transforming.
EMITTED SEQUENCE: sequence output from an image processor node, or a sequence device. (Example usage: a media server's emitted sequences consist of media streams or image sequences.)
ROUTE/ROUTING: the act of receiving electronic data from one or more sources, combining and/or scheduling and/or processing and then delivering, or just delivering, said electronic data to one or more destinations.
NODE: a means for a unit of functionality; nodes can be implemented as software or hardware or a combination, and can be local or distributed, for example.
CONNECTION/CONNECTED: the ability to send and/or receive data or electronic data, either through wires, fibers, wireless transmissions, or any other means.
CLIENT: a system which can form one or more connections with one or more other systems. A client may have its properties set by an external system to which it is connected.
SERVER: a client which can receive requests from other clients or servers and respond to them.
CHARACTERISTICS: information about an object (which may, for example, be a client, node, sequence, or request). In the case of a client, such information may include the type of device the client is associated with, for example, a cell phone, or a personal computer, and such information as is necessary to determine the resolution and type of sequence the client is able to process. Characteristics may be transmitted by or with the object, or, may be able to be determined by such activities as pinging or sampling the object.
EMITTED STREAM CHARACTERISTICS: Characteristics relating to an emitted stream.
RECORD: a data structure or pointer to a data structure which identifies an object such as a client, node, sequence, request, or other electronic data, and which also may store characteristics relating to that object.
ASSOCIATION INSTANCE: a data structure or pointer to a data structure which associates two records. For example, an association instance may be a data structure containing two records. Furthermore, an association instance may contain one or more ancillary data structures or one or more pointers to ancillary data structures.
CONNECTION NODE: a node which controls connections.
ASSOCIATION NODE: a node which forms association instances.
SOURCE SEQUENCE NODE: a node which processes source sequences. When there is only one source sequence input in a server context, then this node may simply hard wire the source sequence to where it needs to go within the server.
VIEW REQUEST NODE: a node which routes view requests.
EMITTED SEQUENCE NODE: a node which routes emitted sequences.
MEDIA SERVER: a server associated with media; for example, a media server can receive and/or distribute media, whether modified or unmodified; in preferred embodiments, a media server includes a source sequence node, a connection node, an association node, a view request node, an emitted sequence node, and one or more image processor nodes.
VIRTUAL MEDIA SERVER: a media server in which the nodes are not necessarily in the same physical location.
PASSIVELY VIEW: view an emitted sequence associated with a media server.
SELECTIVELY VIEW: passively view with the added ability to send view requests to a media server, and, as a result, browse multiple sequences.
INTERACTIVELY VIEW: selectively view or passively view, but with the additional ability to send view requests to a media server, and, as a result, exercise some control over how a source sequence is processed to become an emitted sequence.
DIRECTOR: an entity, be it human or non human, which controls one or more sequences.
DIRECTOR SEQUENCE: sequence controlled by a director.
DIRECT/DIRECTED: the act of controlling one or more sequences.
VIEWER CLIENT: a client with the ability to passively view, selectively view, or interactively view. Viewer client abilities can be altered by a server it is connected to.
PASSIVE CLIENT: a viewer client with the ability to passively view.
SELECTIVE CLIENT: a viewer client with the ability to selectively view.
INTERACTIVE CLIENT: a viewer client with the ability to interactively view.
SOURCE SERVER: a server embodying one or more sequence devices.
WIDE ANGLE SERVER: a source server embodying a wide angle device.

What is claimed is:

1. A method for delivering a media stream to a group of viewer clients, comprising the steps of:
    sampling multiple virtual camera view requests from multiple view clients to group similar but different virtual camera view requests together into a new group of virtual camera view requests, a virtual camera view request only being considered for inclusion in said new group of virtual camera view requests if received within a specific designated time interval;
    mapping said new group of virtual camera view requests into one consolidated virtual camera view request based on similarities of said virtual camera view requests included in said new group of virtual camera view requests;
    generating, before delivering, a responsive single media stream designated by said one consolidated virtual camera view request; and
    delivering said responsive single media stream to the view clients that made at least one of said virtual camera view requests included in said new group of virtual camera view requests,
    wherein the virtual camera view requests specify pan, tilt and zoom parameters for viewing a media stream.

2. The method of claim 1, wherein characteristics of the clients are conveyed to one or more image processor nodes associated with the clients.

3. The method of claim 2, wherein the one or more image processor nodes adjust one or more of the image streams according to the characteristics of the clients.

4. The method of claim 1, further comprising the step of:
    dynamically compressing the image streams.

5. The method of claim 1, wherein the step of mapping said new group of view requests into one consolidated view request comprises averaging multiple virtual camera view requests to map into a single virtual camera view request.

6. The method of claim 1, further comprising the step of:
    dynamically modifying grouping criteria to increase or decrease the size of the group.

7. The method of claim 1, wherein the virtual camera view requests are grouped and assigned to an image processor node.

8. The method of claim 1, wherein the virtual camera view requests are limited to facilitate grouping of the request.

9. The method of claim 8, wherein the limits include not allowing continuous pan, tilt, and zoom requests.

10. A method for distributing wide-angle image sequences from a wide-angle device, comprising the steps of:
receiving virtual camera view requests for media streams from one or more viewer clients;
generating, before outputting, a limited number of media streams at a media server capable of distributing ones of the media streams to multiple viewer clients; and
outputting a media stream in response to one or more different virtual camera view requests using an image processor node to process said output media stream,
said output media stream being derived from a live wide-angle real time camera view modified according to characteristics of said one or more different virtual camera view requests and one or more viewer clients corresponding to said one or more different virtual camera view requests,
said characteristics sent to the media server by a corresponding viewer client in a message,
said characteristics including whether said corresponding viewer client gets interactive views,
said one or more different virtual camera view requests comprising sequence processing instructions,
said characteristics and said instructions used at least in part to map said one or more different virtual camera view requests into consolidated virtual camera view requests based on similarities between said one or more different virtual camera view requests, ones of said consolidated virtual camera view requests generating corresponding single responsive media streams,
wherein the virtual camera view requests specify pan, tilt and zoom parameters for viewing said real time camera view.

11. The method of claim 10, further comprising the step of:
checking identification of one or more viewer clients to authorize a viewer client connection to or disconnection from the media server.

12. The method of claim 10, further comprising the step of:
basing viewer client access to the media server on authorization and availability of media server resources.

13. The method of claim 10, further comprising the steps of:
sampling multiple virtual camera view requests from multiple view clients within a given time interval to group similar but different virtual camera view requests together;
mapping said grouped similar but different virtual camera view requests into a single view request; and
generating a single media stream delivered to all the view clients making the virtual camera view requests in each generated group.

14. The method of claim 10, further comprising the step of:
increasing the probability of the multiple virtual camera view requests being reduced to one virtual camera view request by limiting the viewer client camera control to a set of presets.

15. The method of claim 10, further comprising the step of:
limiting the viewer client camera control by not allowing continuous pan, tilt, zoom control.

16. The method of claim 10, further comprising the step of:
creating records for a plurality of image processing nodes and storing in a node queue in an association node on the media server.

17. A method for outputting a media stream from a wide-angle device, comprising the steps of:
outputting at least one media stream modified from a live wide-angle camera view responsive to virtual camera view requests, wherein the virtual camera view requests originate from multiple viewer clients and said at least one media stream is modified according to characteristics of the viewer clients, said virtual camera view requests being transmitted from the individual clients in a message for use in modifying the at least one media stream for receipt;
generating a limited number of media streams to distribute each of multiple media streams to multiple viewer clients, wherein at least some virtual camera view requests that are different from each other are grouped together according to similarity to output, before distributing, a separate common media stream to each individual group, modified at least in part according to the transmitted viewer client characteristics; and
providing directionally enhanced sound according to said virtual camera view request, wherein the virtual camera view request is directed toward a portion of a view from the wide-angle camera view, the directionally enhanced sound emphasizing sounds associated with the portion and de-emphasizing sounds not associated with the portion,
wherein the virtual camera view requests specify pan, tilt and zoom parameters for viewing said live wide-angle camera view.

18. The method of claim 17, wherein the virtual camera view requests include allowing pan, tilt, and zoom requests, said pan, tilt, and zoom requests being limited to preset pan, tilt and zoom specification.

19. The method of claim 17, further comprising the step of:
sampling the multiple virtual camera view requests from the multiple view clients within a given time interval to group similar virtual camera view requests together into a single virtual camera view request.

20. The method of claim 17, further comprising the step of:
dynamically modifying similarity criteria to increase or decrease the size of the group.

* * * * *